May 28, 1957 — N. D. CLAPP — 2,793,919
SELF-LUBRICATING BEARING
Filed June 7, 1954

Inventor
Nathaniel D. Clapp
by Roberts, Cushman & Grover
Attys.

2,793,919
Patented May 28, 1957

2,793,919

SELF-LUBRICATING BEARING

Nathaniel D. Clapp, Prides Crossing, Mass., assignor to Wakefield Bearing Corporation, Wakefield, Mass., a corporation of Massachusetts Application June 7, 1954, Serial No. 434,949

3 Claims. (Cl. 308—240)

This invention pertains to shaft bearings of the self-lubricating type, particularly to bearings which in use are exposed to dust-laden air. As instances of such use, but without limitation, the bearing of the present invention may be employed for supporting the front bottom roll of a textile drawing frame or the like, or as a bearing for the shaft of a ventilating fan, and is of especial utility in places where the temperature of the surrounding air is high.

Self-lubricating bearings of the oil-absorbent type are prone to accumulate dust from the surrounding air, and the oil film on the accumulated dust particles tends rapidly to oxidize or otherwise degenerate and lose its lubricating characteristics, so that the bearing soon suffers from the loss of proper lubrication.

The principal object of the present invention is to provide a bearing of self-lubricating type which retains its initial lubricating characteristics throughout a long period of use, even though exposed to dust-laden air or equivalent working conditions. A further object is to provide a bearing so designed as to be self-cleaning, that is to say, one which automatically tends to eject accumulations of dust or dirt from the bearing surfaces. A further object is to provide a bearing which tends to keep the surface of the rotating shaft smooth and polished, though at the same time maintaining proper lubrication. Other and further objects and advantages of the invention will be pointed out in the following and more detailed description and by reference to the accompanying drawings, wherein Fig. 1 is an end elevation of the bearing of the present invention, showing a shaft (in section) mounted in the bearing;

The present invention is based upon the discovery that when the upper block or cap member of the bearing is of oil-absorbent wood while the lower member or block of the bearing is of metal, and with the undersurface of the cap member exposed except where it contacts the shaft, the bearing tends to keep itself clean by automatically ejecting accumulations of oxidized oil and dirt. While desirable results are attainable by this combination when the lower member or block of the bearing is of ordinary metal, superior results are noted when the lower member or block of the bearing is of porous metal having its pores filled with lubricating medium.

The exact reason for this improved action, when the bearing comprises a combination of metal and oil-impregnated wood is not fully understood, although it appears that the oil-impregnated cap has an action somewhat like the so-called "lap" used in the mechanical arts for producing a high polish upon a metal surface. Obviously, the wood cap yields resiliently in response to pressure more readily than metal, and possibly the shaft-contacting surface of this cap member picks up particles, perhaps of molecular size, torn off from the metal base block by the rotation of the shaft and uses these particles as a polishing medium. Whatever the underlying cause may be, it has been observed that this combination provides a bearing which, even under very adverse conditions of use where the surrounding air carries a great deal of dust, as for example, lint in a textile spinning mill, the bearing retains its initial lubricating characteristics for long periods and the rotating shaft takes a high polish with no tendency to seize or grip in the bearing.

As herein illustrated, the numeral 10 designates a portion of the frame of a textile machine, for example, a drawing frame, having a suitably shaped recess for holding the lower block 11 of the bearing of the present invention. While as above suggested, this block may be of ordinary metal, it is preferred to employ a porous metal having its pores filled with lubricating medium. This porous metal may be such as is produced by the compression in a mold and the sintering of powdered metal according to well known practice in the powdered metal art. For the present purpose it has been found useful to incorporate with the metal powder approximately 3% of graphite, although this proportion is cited merely by way of example and not as a limitation, and the particular metal powder used will depend upon the purpose for which the bearing is intended and the loads which it must sustain, such matters being within the province of those skilled in the making of porous bearings.

Figure 3:
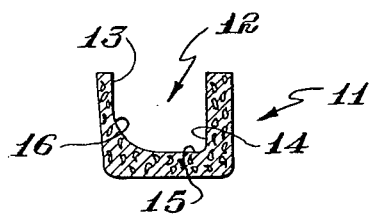
Fig. 3 is a transverse section through the lower block of the bearing, separate from other parts.

As illustrated in Fig. 3, the block 11 is provided with a cavity 12 which in general is of rectangular contour having the side walls 13 and 14 which are spaced apart a distance approximately equal to the diameter of the shaft S which is to be used and having a horizontal bottom surface 15 and the downwardly concave arcuate portion 16 which merges tangentially with the parts 13 and 15 of the wall. As illustrated, the part 16 is approximately a quadrant of arc, and when the shaft S, which as here illustrated is the shaft portion of the front bottom roll of a textile drawing frame, is mounted in the block 11, the surface of the shaft contacts this cylindrically curved surface 16 and also makes a substantial line contact with the wall 14 of the cavity at the point 17. With this arrangement, the shaft may be dropped into the cavity 12, seating against the surface 16 and being held properly in position by its contact at the line 17.

Figure 1:
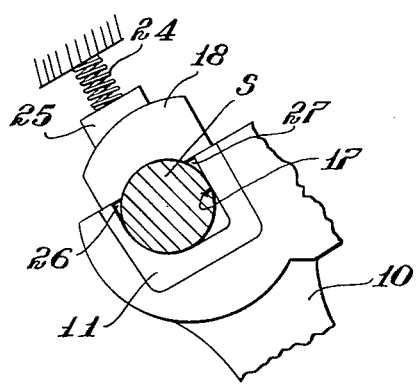
Figure 2:
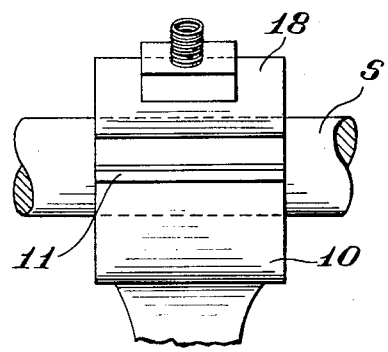
Fig. 2 is a front elevation of the bearing and the shaft.
Figure 4:
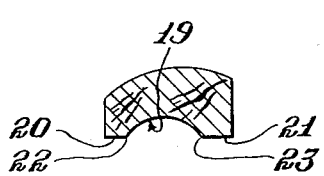
Fig. 4 is a transverse section through the upper block or cap member of the bearing.

The upper member or cap 18 of the bearing consists of a block of wood, preferably hard wood such as maple, impregnated with lubricating medium. By soaking the wood in oil at an elevated temperature it is possible to incorporate approximately 40% by weight of oil with the wood. As illustrated in Fig. 3, the block 18 has an upwardly concave cylindrically curved surface 19 for contact with the surface of the shaft where that is exposed above the upper edge of the block 11, the cap 18 having horizontal lower surface portions 20 and 21 which are located at opposite ends of the cylindrically curved surface to form scraping edges 22 and 23 parallel to the axis of the shaft. After placing the shaft in the lower bearing block 11, the cap is placed on the shaft and is kept in contact with the shaft preferably by the use of a light spring 24, which may, for example bear against a shoe 25 shaped to fit over the upper part of the cap 18. However, any appropriate means may be provided for holding the cap 18 in proper position and with proper pressure against the shaft. As will be noted from inspection of Fig. 1, the horizontal bottom surface of the cap 18 adjacent to each of the scraping edges 22 and 23 is exposed within channels 26 and 27 respectively, extending along the shaft, and as the shaft turns any accumulation of dust and oil will be scraped off by one of the edges 22 or 23 (according to the direction of rotation), then being free to flow through one of the channels 26 or 27 to the outside of the bearing, thus keeping the bearing clean.

While one embodiment of the invention has herein been shown by way of example, it is to be understood that the invention is broadly inclusive of any and all modifications, either of structure or material, falling within the terms of the appended claims.

I claim:

1. A shaft bearing comprising a base block and a cap, the base block being of metal and designed to support the weight of the shaft and the cap being of oil-impregnated wood, the cap having a cylindrically curved, upwardly concave surface for contact with the shaft, and having a lower surface which intersects said concavely curved surface to form a scraping edge, the parts being so constructed and arranged as to provide a discharge channel extending longitudinally of the shaft from said scraping edge, the base block being of porous, oil-absorbent metal and having a cavity for the reception of the shaft, said cavity having a downwardly concave cylindrically curved surface of approximately 90° arcuate extent for contact with the shaft, the cavity also having a substantially flat wall which makes a line contact with the shaft in a diametrical plane of the shaft which intersects said cylindrically curved surface, and resilient means constantly urging the cap toward the base block.

2. In combination, with the front bottom roll of a textile drawing frame, said roll having a shaft portion designed to turn in a bearing, a bearing comprising a base block having a cavity therein, having opposed, parallel walls spaced apart a distance substantially equal to the diameter of the shaft, the wall of the cavity comprising a downwardly concave cylindrically curved surface of an extent to contact approximately a quadrant of the periphery of the shaft, the wall of the cavity also having a surface spaced from said cylindrically curved surface operative to make a line contact with the shaft, a cap having an upwardly concave cylindrically curved surface operative to engage the upper part of the periphery of the shaft, the cap having a lower surface which intersects said concave surface to form a scraping edge parallel to the axis of the shaft, the parts being so constructed and arranged as to provide a channel, extending longitudinally of the shaft from said scraping edge to the end of the base block, means urging the cap toward the base block, and means supporting the base block, the cap being of oil-impregnated hard wood and the base block being of porous metal containing lubricating medium within its pores.

3. A shaft bearing comprising a base block and a cap, the base block being of metal and designed to support the weight of the shaft and the cap being of hard wood initially containing approximately 40% by weight of absorbed oil and the base block being of compressed and sintered powdered metal comprising approximately 3% of graphite.

References Cited in the file of this patent

UNITED STATES PATENTS

| 1,358,668 | Williams | Nov. 9, 1920 |
| 1,396,122 | Johnson | Nov. 8, 1921 |
| 1,480,496 | Bobo | Jan. 8, 1924 |
| 1,876,376 | Wilkinson | Sept. 6, 1932 |
| 2,045,030 | Thompson | June 23, 1936 |
| 2,233,957 | Northway | Mar. 4, 1941 |